G. D. HAYDEN.
AUTOMATIC SCREW MACHINE.
APPLICATION FILED APR. 21, 1915.

1,173,574.

Patented Feb. 29, 1916.

Witnesses:
M. V. Anderson
Samuel S. Carr

Inventor,
George D. Hayden,
By Robert S. Carr, Attorney.

UNITED STATES PATENT OFFICE.

GEORGE D. HAYDEN, OF OAKLEY, OHIO, ASSIGNOR TO THE CINCINNATI PLANER COMPANY, OF CINCINNATI, OHIO, A CORPORATION OF OHIO.

AUTOMATIC SCREW-MACHINE.

1,173,574.  Specification of Letters Patent.  Patented Feb. 29, 1916.

Application filed April 21, 1915. Serial No. 22,934.

*To all whom it may concern:*

Be it known that I, GEORGE D. HAYDEN, a citizen of the United States, residing at Oakley, Hamilton county, Ohio, have invented a new and useful Improvement in Automatic Screw-Machines, of which the following is a specification.

My invention relates to automatic screw machines and the objects of my improvements are to provide adjustable mechanism for simultaneously feeding a plurality of cutting tools different distances during the same predetermined interval of time; to provide fixed rectifying stops for the cross slide tools, and to provide simple and durable construction and assemblage of the co-acting members for securing facility of operation, precision and efficiency of action.

Figure 1:
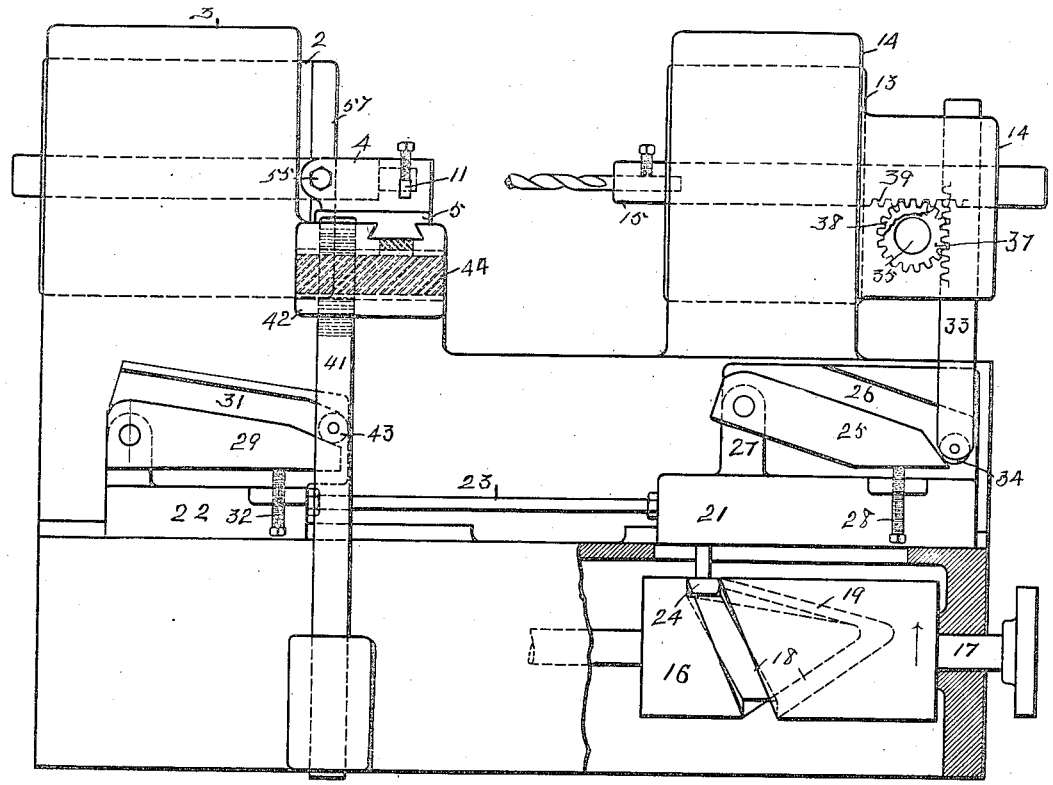
Figure 2:
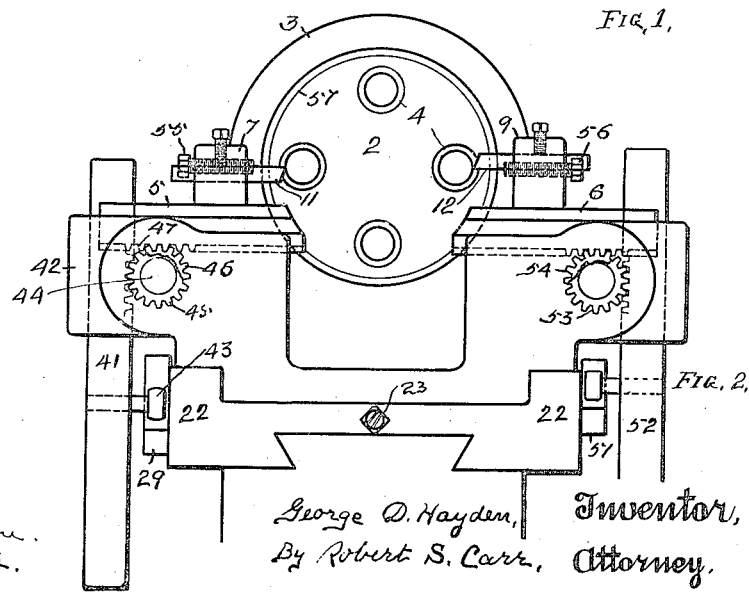

These objects may be attained in the following described manner, as illustrated in the accompanying drawings, in which:

Figure 1 is a side elevation of parts of a multiple spindle automatic screw machine embodying my improvements, and Fig. 2 a front end elevation of the work head and the cross slides.

In the drawings, 1 represents the bed, 2 the work spindle head mounted in the casing, 3 and arranged to be indexed in the usual manner (not shown), 4 the hollow work spindles journaled in the head 2 and arranged to be driven simultaneously in the usual manner.

5 and 6 are similar cross slides provided with tool posts 7 and 9 for the respective tools 11 and 12. The tool spindle head 13 is secured in casing 14, and 15 is one of a plurality of similar tool spindles movable longitudinally in head 13 and adapted to register with the corresponding work spindles 4, all being constructed and arranged in the ordinary manner.

The drum cam 16 mounted on the driven shaft 17 is formed with the cam groove having the long and short stretches 18 and 19. Slides 21 and 22 connected together by means of rod 23 are movable longitudinally on the base by means of the engagement with the cam groove in drum 16 of the pin 24 which depends from slide 21. An arm 25 formed with the cam groove 26 is pivotally secured at one end to the lug 27 which projects above the slide 21 and may be moved and maintained with the groove therein in different vertical angles by means of the adjusting screw 28. A similar arm 29 formed with the groove 31 and mounted in like manner on the slide 22 may be moved and maintained with said groove in different vertical angles by means of the adjusting screw 32. A vertical rack 33 slidably mounted in the casing 14 is provided with the roller 34 in movable engagement with the groove 26. A shaft 35 journaled in said casing is provided with a pinion 37 in engagement with said rack and also with a similar pinion 38 in engagement with the rack 39 formed on the tool spindle 15. A vertical rack 41 mounted to slide in the projection 42 of the casing 3 is provided with a roller 43 in movable engagement with the groove 31. A shaft 44 journaled in said projection is provided with pinion 45 in engagement with said rack and also with a similar pinion 46 in engagement with the rack 47 formed on the cross slide 5.

Similar connections including the adjustable cam 51, rack 52, and pinions 53 and 54 serve to actuate the rear cross slide 6 from the slide 22 in like manner. The respective tool posts 7 and 9 are provided with adjusting screws 55 and 56 for limiting the advance movement of said tools by contact with the tempered steel ring 57 secured on the work spindle head 2. Said ring may be sufficiently ground at the respective points of contact with said screws for correcting any error in the distance of the center of the respective work spindles to the adjacent surface of the ring which might occur in construction and for the purpose of securing accurate limit to the forward movements of the cross slides with the tools.

In operation, the slide 21 may be provided with independently adjustable cams 25 with connections for simultaneously advancing the corresponding tool spindles either the same or different predetermined distances and returning them during a single turn of the drum cam 16, wherein the long stretch 18 of the cam groove provides for a slow advance movement and the short stretch 19 for a quick return. The different tool spindles with their tools may thus be utilized for cutting different respective lengths during the same period of time. Either of the tool spindles may be maintained out of action by adjusting its corresponding cam 21 with the groove 26 in a plane parallel therewith.

The cross slides with the respective cutting tools may be simultaneously advanced slowly toward the work in the same manner either the same or different predetermined distances and quickly returned by means of the adjustable cams 29 and their connections therewith.

Without attempting to set forth in detail the various constructions and arrangements in which the features of my invention may be embodied, what I claim and desire to secure by Letters Patent of the United States is:—

1. In an automatic screw machine, the combination of a tool spindle, a drum cam, an adjustable cam arranged to be reciprocated thereby, and connections therefrom for reciprocating the said spindle longitudinally.

2. In an automatic screw machine, the combination of a tool spindle, a driven drum cam, a slide reciprocated longitudinally, an adjustable cam on the slide, and rack and pinion connections therewith for reciprocating the spindle.

3. In an automatic screw machine the combination of a tool spindle, a driven cam, an adjustable cam reciprocated thereby in different predetermined respective intervals of time, and connections actuated by the latter cam for slowly advancing and quickly returning the spindle.

4. In an automatic screw machine the combination of a tool spindle, an adjustable cam, a drum cam arranged to move said cam in opposite directions at respective different speeds, and mechanism actuated by the adjustable cam for moving the spindle longitudinally different predetermined distances and in opposite directions at respective different speeds.

5. In an automatic screw machine the combination of a tool spindle, a driven cam, and connections including an adjustable cam actuated thereby for slowly advancing the spindle different predetermined distances and quickly returning it.

6. In an automatic screw machine, a tool spindle, a cross slide, a drum cam, slides connected together and arranged to be simultaneously reciprocated thereby, adjustable cams on the respective slides, and separate connections therefrom for simultaneously advancing the spindle and the slide different predetermined distances slowly, and quickly returning them.

7. In an automatic screw machine the combination of a plurality of tool carrying members, a drum cam, a member arranged to be reciprocated thereby in respective opposite directions at predetermined speeds, a plurality of separately adjustable cams carried thereby, and separate similar connections actuated by the respective cams for reciprocating the corresponding former members, whereby they may be simultaneously advanced different respective distances and returned, during the same interval of time.

8. In an automatic screw machine the combination of a plurality of tool carrying members, separately adjustable cams, independent actuating connections therefrom with the corresponding said members, a drum cam, and connections actuated thereby for reciprocating the cams simultaneously.

9. In an automatic screw machine the combination of a work spindle head provided with a hardened metal ring concentric therewith and a cross slide provided with an adjusting screw for contacting with the ring for limiting its advance movement.

10. In an automatic screw machine the combination with the work spindle head being rotatively adjustable and provided with a plurality of work spindles, and a plurality of cross slides each provided with an adjusting screw, of a hard metal ring secured on the head and concentric therewith and whereon fixed justifying stops are formed for the screws with the cross slides.

11. In an automatic screw machine, the combination of a plurality of adjustable cams, driven connections for reciprocating them in unison, a plurality of tool carrying members, and separate connections therewith actuated by the respective cams for advancing said members respectively different predetermined distances during the same interval of time.

12. In an automatic screw machine, the combination of a plurality of adjustable cams, a driven drum cam, mechanism actuated thereby for reciprocating the adjustable cams simultaneously, a plurality of tool carrying members, and independent connections therewith actuated by the respective adjustable cams for simultaneously advancing said members predetermined different distances respectively and at correspondingly different speeds.

13. In an automatic screw machine, the combination of a series of adjustable cams, a driven drum cam, mechanism actuated thereby for reciprocating the adjustable cams in unison and at different speeds in respective opposite directions, a similar series of tool carrying members, independent mechanisms actuated by the respective adjustable cams for simultaneously advancing corresponding said members different respective predetermined distances and at different speeds during the same interval of time and returning them at correspondingly accelerated speeds.

GEORGE D. HAYDEN.

Witnesses:
  H. G. BEYLAND,
  R. S. CARR.